United States Patent
Sahay et al.

(10) Patent No.: US 9,021,130 B1
(45) Date of Patent: Apr. 28, 2015

(54) PHOTONIC LINE SHARING FOR HIGH-SPEED ROUTERS

(75) Inventors: Vasant Sahay, Sunnyvale, CA (US); Tal Lavian, Sunnyvale, CA (US); Bruce Schofield, Tyngsboro, MA (US)

(73) Assignee: RPX Clearinghouse LLC, San Francisco, CA (US)

( * ) Notice: Subject to any disclaimer, the term of this patent is extended or adjusted under 35 U.S.C. 154(b) by 3680 days.

(21) Appl. No.: 10/750,531

(22) Filed: Dec. 31, 2003

(51) Int. Cl.
*G06F 15/173* (2006.01)
*H04L 12/701* (2013.01)
*H04L 12/28* (2006.01)

(52) U.S. Cl.
CPC ........................... *H04L 12/28* (2013.01)

(58) Field of Classification Search
USPC ............... 709/238, 239, 240, 244; 370/351; 398/45, 49, 50, 57
See application file for complete search history.

(56) References Cited

U.S. PATENT DOCUMENTS

| | | | |
|---|---|---|---|
| 5,757,795 A * | 5/1998 | Schnell | 370/392 |
| 5,828,475 A * | 10/1998 | Bennett et al. | 398/52 |
| 6,647,208 B1 * | 11/2003 | Kirby | 398/45 |
| 6,970,451 B1 * | 11/2005 | Greenberg et al. | 370/352 |
| 6,970,942 B1 * | 11/2005 | King et al. | 709/238 |
| 7,177,544 B1 * | 2/2007 | Wada et al. | 398/51 |
| 7,493,410 B2 * | 2/2009 | Moore et al. | 709/238 |
| 2004/0015590 A1 * | 1/2004 | Nagami et al. | 709/227 |
| 2004/0184615 A1 * | 9/2004 | Elliott et al. | 380/283 |
| 2005/0030951 A1 * | 2/2005 | Maciocco et al. | 370/395.2 |

* cited by examiner

*Primary Examiner* — Derrick Ferris
*Assistant Examiner* — Scott M Sciacca
(74) *Attorney, Agent, or Firm* — Christopher & Weisberg, P.A.

(57) ABSTRACT

Embodiments of the present invention present a method and apparatus for photonic line sharing for high-speed routers. Photonic switches receive high-speed optical data streams and produce the data streams to a router operating according to routing logic and produce optical data streams according to destination addresses stored in the data packets. Each photonic switch can be configured as one of a 1:N multiplexer or an M:N cross-connect switch. In one embodiment, optical data is converted to electrical data prior to routing, while an alternate embodiment routes only optical data. Another embodiment transfers large volumes of high-speed data through an optical bypass line in a circuit switched network to bypass the switch fabric thereby routing the data packets directly to the destination. An edge device selects one of the packet switched network or the circuit switched network. The bypass resources are released when the large volume of high-speed data is transferred.

21 Claims, 11 Drawing Sheets combined circuit switched and data packet network with multi-stage photonic switching data packet network dual redundant system photonic switch line sharing line sharing with photonic switch routing system data packet routing system data packet routing system controller

| destination IP address | output port | switch | switch position |
|---|---|---|---|

FIG. 7
mapping table photonic switching

FIG. 9 method for routing a data packet in a high-speed routing system multi-stage photonic switching system combined circuit switched and data packet network with multi-stage photonic switching

PHOTONIC LINE SHARING FOR HIGH-SPEED ROUTERS

BACKGROUND

1. Technical Field

The present invention relates to data packet networks and, more particularly, the present invention relates to high-speed routing of data packets in the data packet network.

2. Related Art

Communication service providers, as well as network service providers, face some difficult challenges as the various networks are increasingly modified to work together to provide seamless end-to-end connectivity across the various platforms and protocols. Ever-increasing residential dial-up subscribers and broadband subscribers demand increasing network speed. To meet this demand, network service providers are deploying a large number of complex, port-dense Network Access Servers (NAS) to handle thousands of individual dial-up connections. As such, small and large, as well as private and public, data packet networks are being created to enable users to establish point-to-point connections independent of terminal type and location. Traditional circuit switched voice networks have paved the way for the creation of data packet networks as users loaded the voice networks trying to transmit data, including streaming data (video and voice). Initially, traditional Public Switched Telephone Networks (PSTNs) were used for data transmissions but have been largely supplanted by data packet networks, including various versions of the "Internet" for purposes of data transport.

During the Internet boom, fiber optic cable was installed to meet the increasing demand for high-speed access to the data packet network. With fiber optic cable, optical networks have been developed in various forms utilizing various transport technologies. For example, dense wavelength division multiplexing (DWDM) is being used in optical networks to significantly increase throughput and, more generally, to transport data from point to point. High-speed transceivers up to OC-192 (Optical Carrier, 9.6 gigabits-per-second) have been installed to meet the increasing demand. The expectation being that the high cost of installing and maintaining a high-speed network will be recovered as more users demand more bandwidth. The Internet business climate is changing and demands are being put on operators to provide bandwidth while optimizing the use of their networks to reduce the operating costs. Network operators and network service providers thus need a more economical method to use the expensive resources.

Bandwidth is not only a concern to individuals, but also to service providers. From the operator's perspective, bandwidth is the key to the number of users a communication system can support at any given time, the amount of data that can be transported via the communication system at any given time, and the speed at which the data can be transported. Bandwidth thus translates into a number of potential customers and revenue. For this reason, companies spend billions of dollars annually to develop equipment to increase the bandwidth of communication systems, such as the Public Switched Telephone Network (PSTN), wireless communication systems, wire line communication systems, and/or the Internet.

One key standard that increases the bandwidth of communication systems, is SONET (Synchronous Optical NETwork). SONET was created to provide a cost effective platform for multi-vendor internetworking and offers the advantages of back-to-back multiplexing, compatibility with other standards, and ultra high performance. In particular, SONET is a transmission technology, which resides in the physical layer and can be used to carry a wide variety of types of traffic, including ATM (Asynchronous Transfer Mode) cells. In addition, the SONET physical layer may be used in a wide variety of applications, including LAN-to-LAN interconnections, host-to-host interconnections, video conferencing, team engineering, distributed processing, and advanced scientific research.

The basic building blocks of a SONET system are 125 microsecond frames that come in two sizes of Synchronous Transport Signal (STS) frames: the STS-1 frame and the STS-3 frame. The STS-1 frame provides a bit rate of 51.84 Mbps while the STS-3 frame provides a bit rate of 155.52 Mbps. Once an STS frame is converted from an electrical format into an optical format for transmission, the frame is then referred to as an Optical Carrier (OC), but still has the same bit rate as the STS frame.

As mentioned, SONET is a transmission technology, which differs from switching technology. Switching technology is concerned with how data is routed across the network, while transmission technology is concerned with how data is encoded and transported across the network. SONET, therefore, separates the overhead of switching technology, such as ATM from the payload fields (i.e., the data). As such, SONET is not applied directly to the switching devices of a network, but is used to specify the interface between the switches that are linked by optical fibers. Thus, standard ATM or LAN switches are equipped with a SONET interface in order to comply with the SONET specification.

As the demand for bandwidth escalates, various network elements are being made to receive and transmit optical data for increased performance. Optical equipment and transceivers, for use in network elements such as routers, however, are expensive. Because a router has many different ports, using an optical transceiver for each port results in the use of optical technology for routers being very expensive. What is needed, therefore, is a router with optical transceivers that is economically feasible.

BRIEF SUMMARY OF THE INVENTION

The method and apparatus of the present invention reduces the cost of operating and maintaining high-speed optical fiber networks by using scaleable photonic switches to selectively couple fiber lines to a shared optical transceiver port and optical router. The photonic switches share an optical transceiver input or output with multiple fiber lines thereby reducing the number of optical transceivers needed to service the multiple fiber lines. Unused or lightly used fiber lines may be reduced through the use of photonic switches to carry data packets. Moreover, dedicated backup fiber may be reduced as one backup fiber may be used to provide redundancy for multiple primary fibers.

A routing system of the present invention comprises at least one high data rate input optical port that receives high data rate optical data and converts the optical data to electrical data, switch fabric coupled to receive the electrical data and to switch the electrical data to route the electrical data on a packet-by-packet basis to an output optical port, and at least one photonic switch coupled to a plurality of optical ports. A plurality of fiber lines are coupled to the input optical port and optical output port of the photonic switch to transmit the data packets from a source to a destination stored in the data packet header.

Switch intelligence comprising one of a data packet routing system controller and routing logic evaluates the high data rate optical data to determine an efficient transport mechanism. The transfer of a small volume of data may be routed through the data packet network. The routing logic maintains a mapping table for each input and output photonic switch to optimize the routing of data packets based on the destination IP address. The switch intelligence transmits control commands to route the data packet through the input photonic switch and the output optical switch.

In one embodiment, the optical data is converted to electrical data before routing through the data packet network. In another embodiment the data packet stays in the optical domain during the routing and switching process. Large data transfers are more efficiently transported through a dedicated optical path, or light path, using a mechanism similar to circuit switching in which a dedicated end-to-end optical path is established from the source to the destination. In one embodiment of the present invention, a large volume of data is circuit switched through an optical bypass line to bypass the packet switched circuits to reducing loading on the data packet network. The above-referenced description of the summary of the invention captures some, but not all, of the various aspects of the present invention. The claims are directed to some of the various other embodiments of the subject matter towards which the present invention is directed. In addition, other aspects, advantages and novel features of the invention will become apparent from the following detailed description of the invention when considered in conjunction with the accompanying drawings.

BRIEF DESCRIPTION OF THE SEVERAL VIEWS OF THE DRAWINGS

FIG. 7 illustrates a photonic switch mapping table according to one embodiment of the present invention;

DETAILED DESCRIPTION OF THE INVENTION

Figure 1:
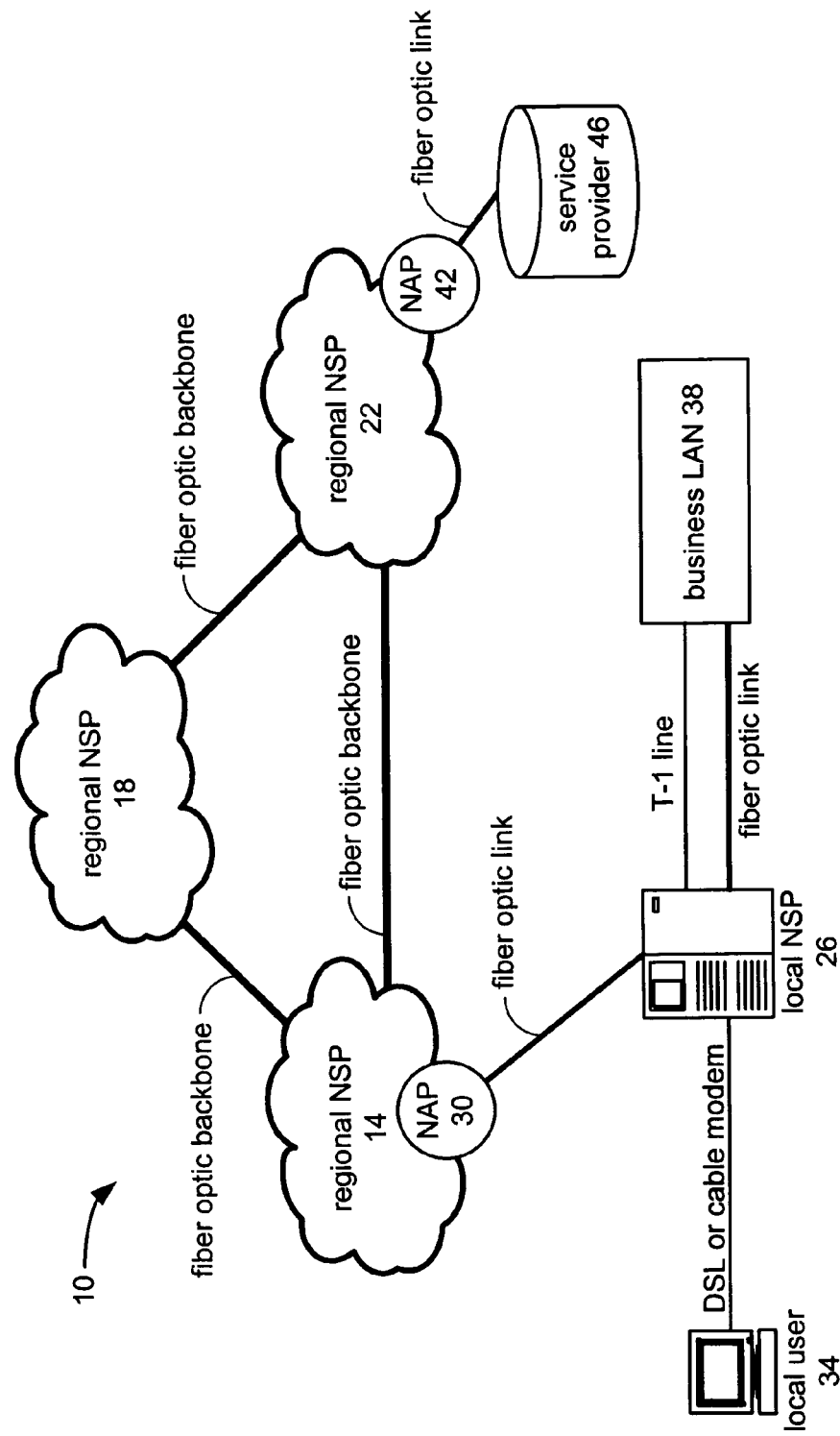
FIG. 1 is a functional block diagram of a data packet network.

FIG. 1 is a functional block diagram of a data packet network. Data packet network 10 comprises a number of networking elements interconnected to transmit and receive data packets. Shown are several regional Network Service Providers (NSP) connected by fiber optic backbones to create a portion of an interconnected data packet network, i.e., the Internet. Regional NSP 14, regional NSP 18, and regional NSP 22 have high-speed routers (not shown) to route data packets between each network over a fiber optic backbone. Each router maintains a configuration table entry for every router with which it can connect. Each of the router entries in the configuration table describes a range of addresses connected to each router. The router accesses the configuration table entry to determine if the router can forward the data packet to the destination.

A local NSP 26 connects to regional NSP 14 through Network Access Point (NAP) 30 to allow network subscribers to access the data packet network. Local user 34 connects to local NSP 26 over a broadband connection including either a Digital Subscriber Line (DSL) or a cable modem. A business Local Area Network (LAN) 38 maintains a fiber optic link to local NSP 26 over a dedicated fiber optic link and also maintains a T-1 (Trunk Level 1) line for backup. Users of business LAN 38 and local user 34 can seamlessly connect to any other entity in the data packet network using a variety of networking protocols such as TCP/IP.

Connected to regional NSP 22 through NAP 42, a service provider 46 provides a number of network services including nightly backup services and secure storage for confidential information. The distributed design of the data packet network allows service provider 46 to provide services to businesses, such as business LAN 38, though not directly connected to the same network service provider or NAP. This aspect of the distributed design of the data packet network is especially desirable for maintaining multiple remote backups in case of a tragic event such as a terrorist attack.

The present invention reduces the cost for network operators, such as service provider 46 and local NSP 26, by reducing the cost of operating redundant and/or unused fiber optic lines through photonic line sharing. High-speed routers for high-speed optical data rates (OC-192, etc.) are shared among lightly used fiber optic lines with sporadic heavy volume by switching data packets through photonic switches based on a destination address.

Figure 2A:
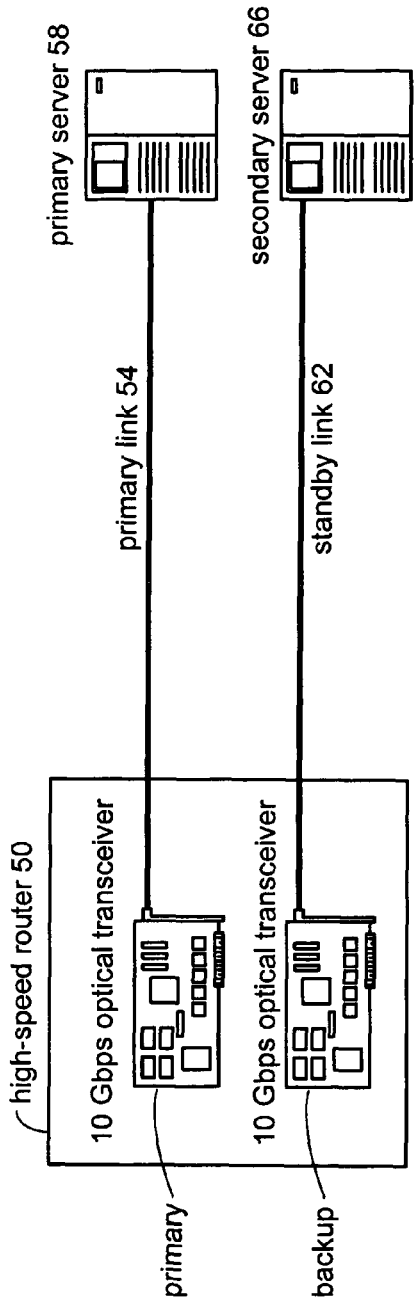
FIGS. 2A and 2B show a dual redundant optical connection and one advantage of photonic line sharing according to one embodiment of the present invention, respectively.
Figure 2B:
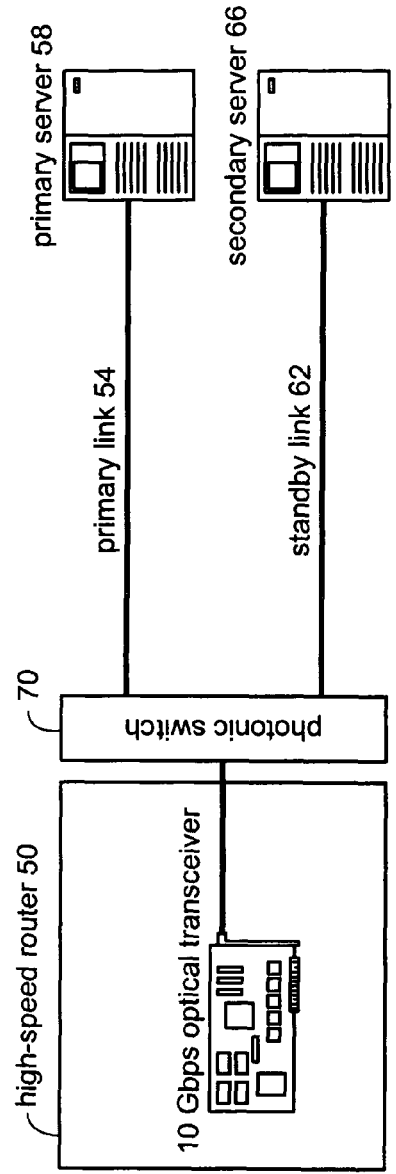

FIGS. 2A and 2B show a dual redundant optical connection and one advantage of photonic line sharing, respectively, according to one embodiment of the present invention. As shown in FIG. 2A, a high-speed router 50 includes two 10 Gbps optical transceivers. Each optical transceiver supports a link to a server wherein one link is an active primary link and the other is a backup or standby link. A primary link 54 carries data packet traffic between the high-speed router 50 and a primary server 58, while a second standby link 62 is a standby link to a secondary server 66. In this configuration, standby link 62 and secondary server 66 are redundant backups to primary server 58 and primary link 54. Accordingly, the second optical transceiver is not used unless there is a failure on the primary server circuit. The cost of maintaining the backup system includes, therefore, an expensive 10 Gbps optical transceiver that is only used for backup purposes. Increasing competition in today's marketplace is driving network operators to reduce costs. One method to reduce cost is to reduce the use of expensive optical transceivers that otherwise sit idle.

FIG. 2B illustrates photonic line sharing according to one embodiment of the present invention. In the configuration of FIG. 2B, the backup optical transceiver has been removed. The primary optical transceiver is coupled to a photonic switch 70 that is further coupled to primary link 54 and to standby link 62. Photonic switch 70 functions to route optical data either to primary link 54 or to standby link 62 depending on a photonic switch control. Photonic switch 70 is much less expensive than a 10 Gbps. Accordingly, the network operator has substantially reduced the cost to the server's operator for supporting the dual redundant system without seriously impairing the functionality of the system.

One aspect of the present invention is to reduce costs by replacing expensive optical transceivers with inexpensive photonic switches. Photonic switches are switches that conduct light, or photons, instead of electrons. Using small micro-mirrors or controllable opaque devices based on silicon technology, the photonic switches create logical ones and zeros by turning light on and off. Electrical switches are typically composed of transistors and resistors and, as such, consume electricity and produce heat. Photonic switches exhibit low power dissipation, low optical loss and, because of their small size, offer a reduction in equipment space "footprint". Additionally, by switching light, the photonic switch operates equally well with low and high data rates so that they are bit-rate independent. Electrical switches exhibit some high frequency loss and are bit-rate dependent and therefore less desirable. Photonic switches can be configured as multiplexers or as digital cross-connect switches to increase the port density of high-speed routers in an optical network.

Another method to reduce cost is to spread the cost of installing and maintaining optical fiber links across all the users of the fiber link. In the example of FIG. 2A, the server's operator is responsible for the cost of two dedicated fiber optic links, namely, primary link 54 and the unused standby link 62. By using the optical transceiver and the standby link unused in other applications, the cost of maintaining the fiber-optic link is reduced.

Figure 3:
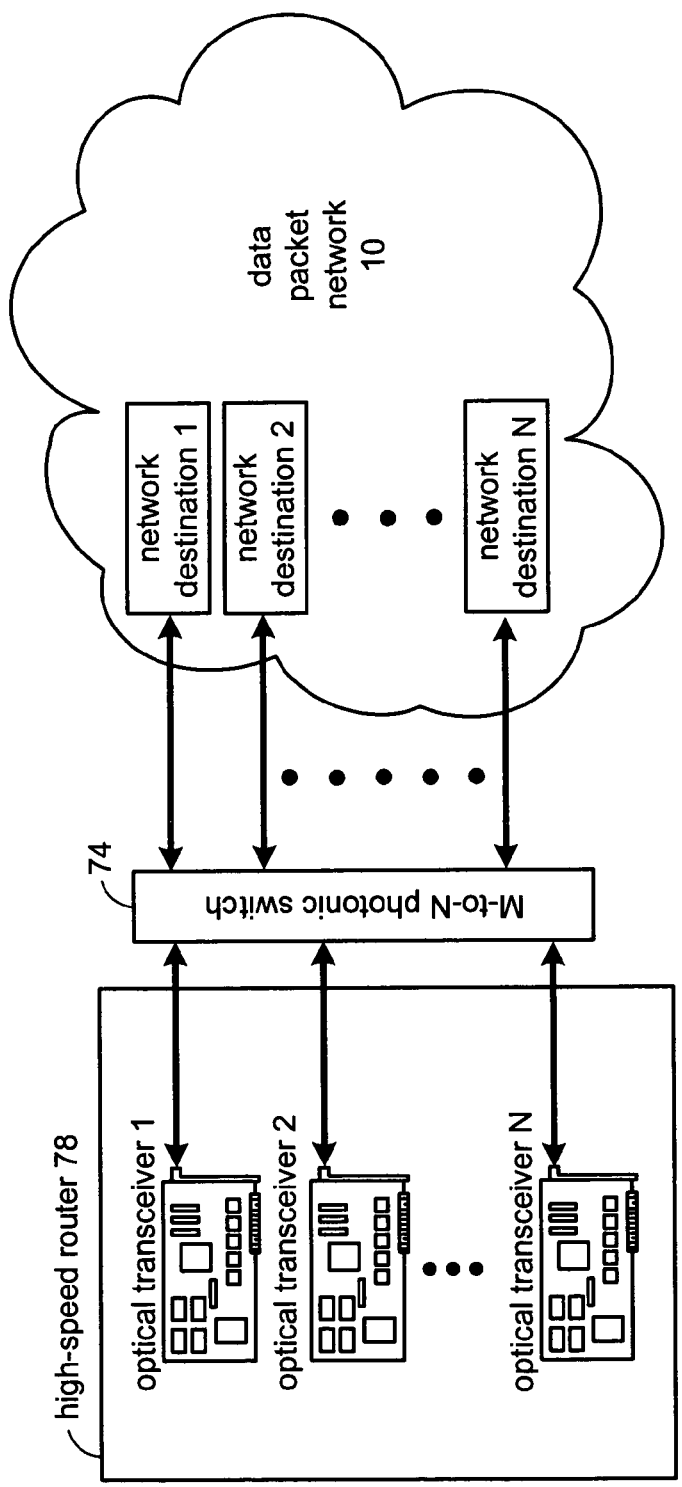
FIG. 3 illustrates line sharing with a photonic switch according to one embodiment of the present invention.

FIG. 3 illustrates line sharing with a photonic switch according to one embodiment of the present invention. In this example, a photonic switch 74 is configured as an M-to-N photonic cross-connect switch, where N is greater than M. A high-speed router 78 includes a plurality (M) of 10 Gbps optical transceivers operably coupled to the input of photonic switch 74. Photonic switch 74 routes the data packets to network destinations (1, 2, . . . N) in data packet network 10. In this configuration, each optical transceiver can route data packets to any network destination by the proper control of photonic switch 74. The routing and control of the photonic switch will be described in relation to FIG. 4 and FIG. 5. Because the photonic switch is less expensive to expand than is adding optical transceivers, fewer optical transceivers are needed to support the data packet routing through the photonic switch to the data packet network. In a normal data packet flow, the routing of data packets through the photonic switch will be transparent to most network users.

Figure 4:
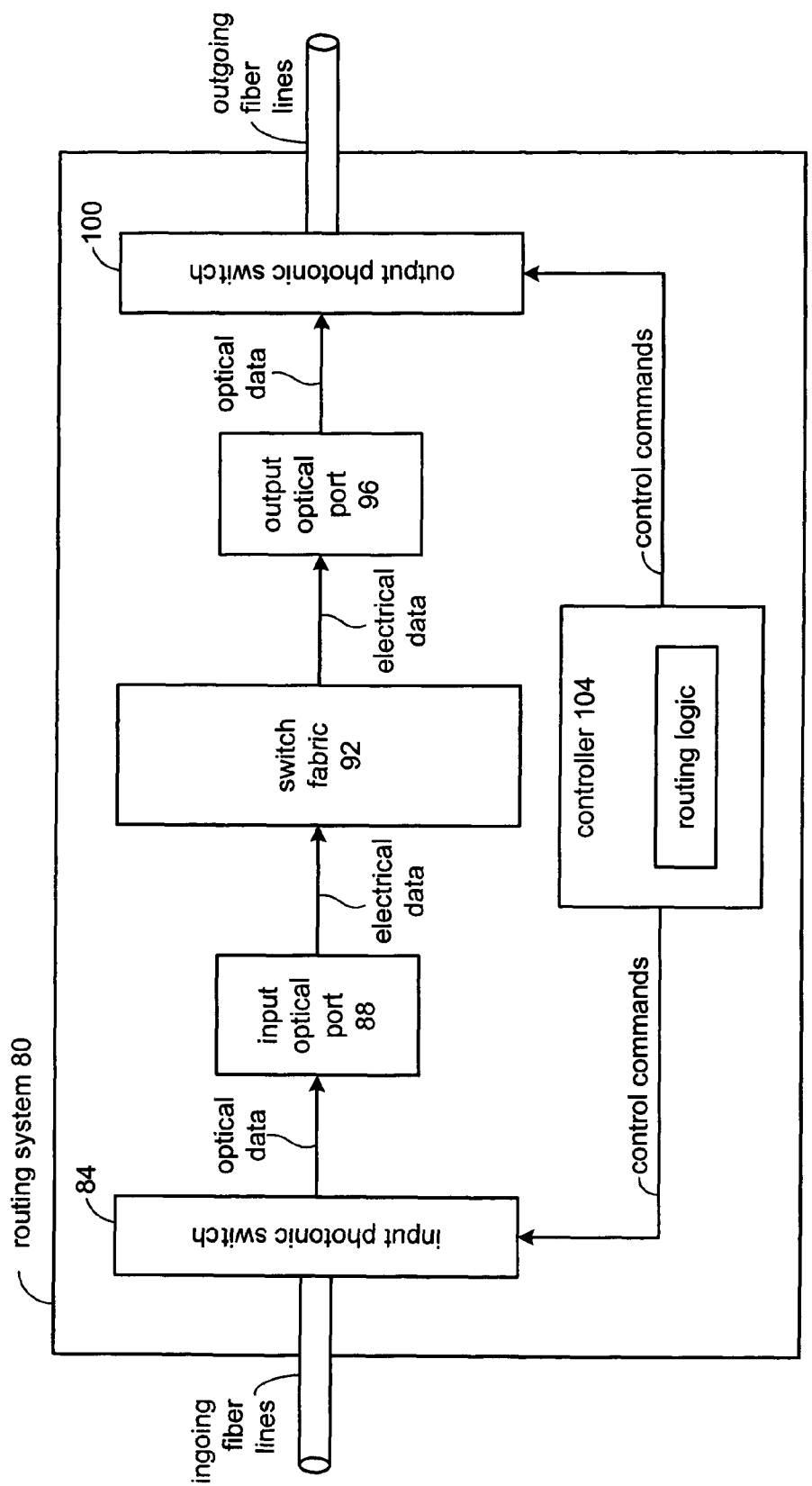
FIG. 4 illustrates a routing system according to one embodiment of the present invention.

FIG. 4 illustrates a routing system according to one embodiment of the present invention. A routing system 80 comprises an input photonic switch 84, an input optical port 88, a switch fabric 92, an output optical port 96, an output photonic switch 100, and a controller 104.

Input photonic switch 84 functions to switch optical data from ingoing fiber lines to input optical port 88 according to control commands received from controller 104. Input optical port 88 receives high data rate optical data from input photonic switch 84 and converts the optical data to electrical data using techniques known to one of average skill in the art. Switch fabric 92 routes the electrical data, as received from input optical port 88, on a packet-by-packet basis according to a destination address stored in the data packet header and routing configuration rules. Similarly, output optical port 96 receives electrical data and converts it to optical data. Controller 104 includes computer instructions that define the routing logic of routing system 80. Based on ingoing fiber line conditions and outgoing fiber line conditions, controller 104 issues control commands to input photonic switch 84 and output photonic switch 100 to route the data packet to the destination address contained in the data packet header by the best route available. Because line conditions change and routing elements can drop out of service, routing system 80 continuously updates the mapping table for the most efficient routing of data packets. As is known to one of average skill in the art, each data packet comprising the complete transmission may be routed by different paths through the data packet network. Output photonic switch 100 is operably coupled to receive the control commands from controller 104 and to route the optical data to the proper outgoing fiber lines and to the proper destination. The operation of controller 104 will be discussed in relation to FIG. 6.

Figure 5:
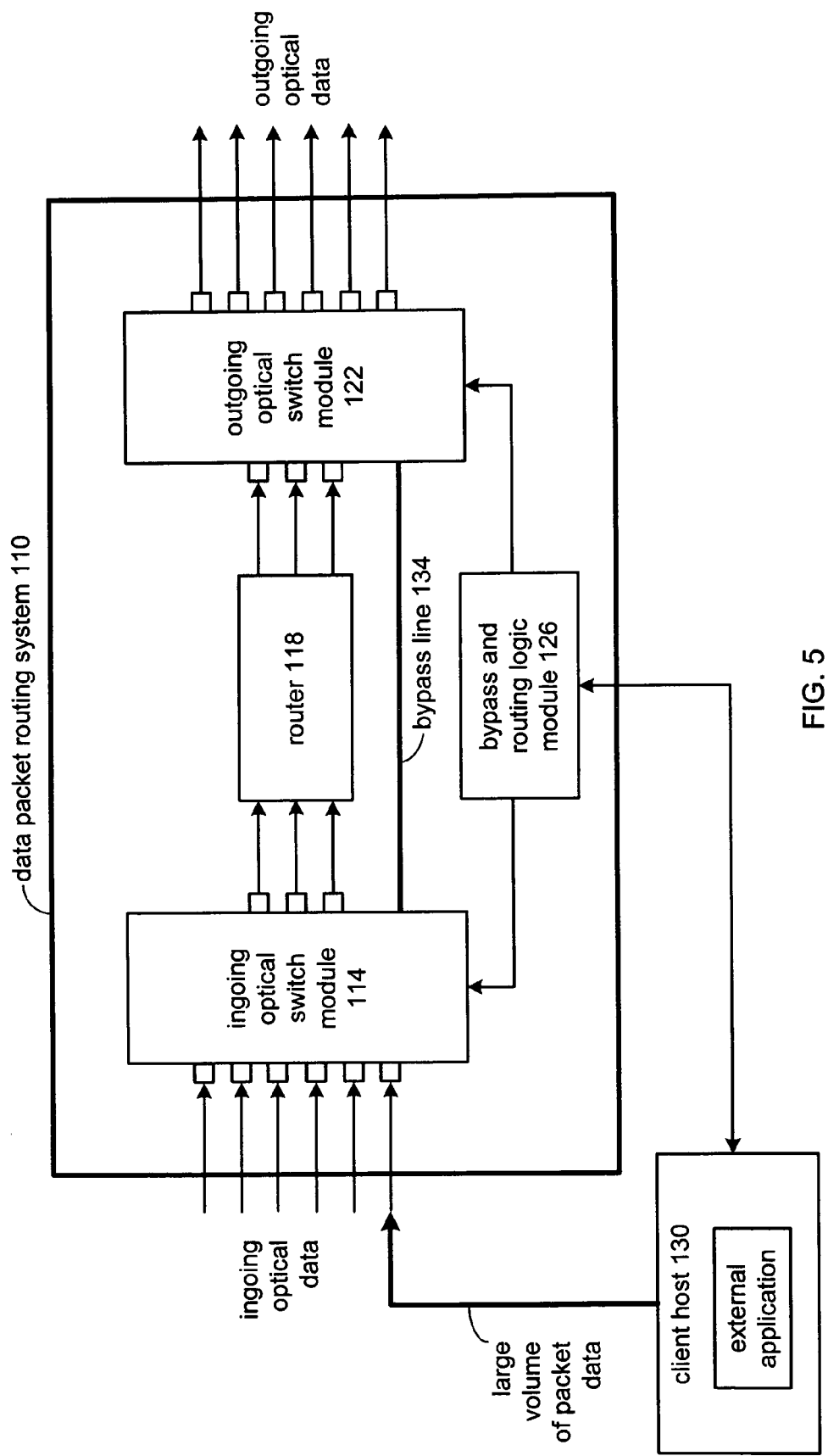
FIG. 5 illustrates a data packet routing system according to one embodiment of the present invention.

FIG. 5 illustrates a data packet routing system according to one embodiment of the present invention. Data packet routing system 110 comprises an ingoing optical switch module 114, a router 118, an outgoing optical switch module 122, and a bypass and routing logic module 126. As may be seen, this embodiment includes the optical switches as part of the routing system. Ingoing optical data is received over a plurality of ingoing optical fiber lines and is coupled to a first plurality of input ports to ingoing optical switch module 114. The ingoing optical data is routed by ingoing optical switch module 114 to a first plurality of input ports according to commands issued from bypass and routing logic module 126. Router 118 directs the data packets to the data packet network according to a destination IP address stored in the data packet header. Additionally, router 118 routes data packets to a second plurality of input ports to outgoing optical switch module 122, which then routes the data packets according to switch settings controlled by bypass and routing logic module 126. The outgoing optical data is further coupled from a second plurality of output ports to outgoing fiber lines by control commands issued from bypass and routing logic module 126.

Routing of normal data packets is accomplished by data packet routing system 110 as is known by one of average skill in the art. Some applications require transferring of large volumes of packet data. This large volume of data places a load on the routing network beyond the design intent of the data packet network. More specifically, each data packet is typically 1.5 kilobits, thus an application transferring a large volume of data, for example a one-gigabyte file, contains over 600,000 data packets. Each router in the routing path looks into each data packet header to make the next-hop decision. The process is repeated over 600,000 times for each router in the routing path. One aspect of the present invention is to reduce the load on the packet switched network by bypassing the data packet routing system (router 118) for very large file transfers (multi-gigabyte and multi-terabyte). Bypass and routing logic 126 selects large file transfers for circuit switching over a dedicated end-to-end optical light path (bypass line 134) to reduce loading on the data packet routing system (router 118). As can be seen in FIG. 5, a client host 130 running an external application is transferring a large volume of data through data packet routing system 110. In this example, routing logic module 126, in communication with client host 130, switches the large volume of data over bypass line 134. The communication between client host 130 and bypass and routing logic module 126 may be over an Ethernet connection or a system signal line. Since router 118 will not be inspecting the data packets from client host 130, bypass and routing logic module 126 must receive a signal to start and stop bypass routing. Client host 130 may set bypass start-stop routing by time, application, provider, request, or for other reasons. For example, routing by time would accommodate backup operations wherein a known volume of data will be transferred in a known amount of time. Generally, bypass routing involves routing the large volumes of data from a number of known source addresses to a number of predefined destination addresses. Bypass and routing logic module 126 is shown as a component of data packet routing system 110. However, it may be designed external to data packet routing system 110, such as a card in an optical rack controlling a plurality of optical switch modules. Additionally, bypass and routing logic module 126 may be formed in a controller comprising an Application Specific Integrated Circuit (ASIC) or Field Programmable Gate Array (FPGA) as is known of by one of average skill in the art.

Figure 6:
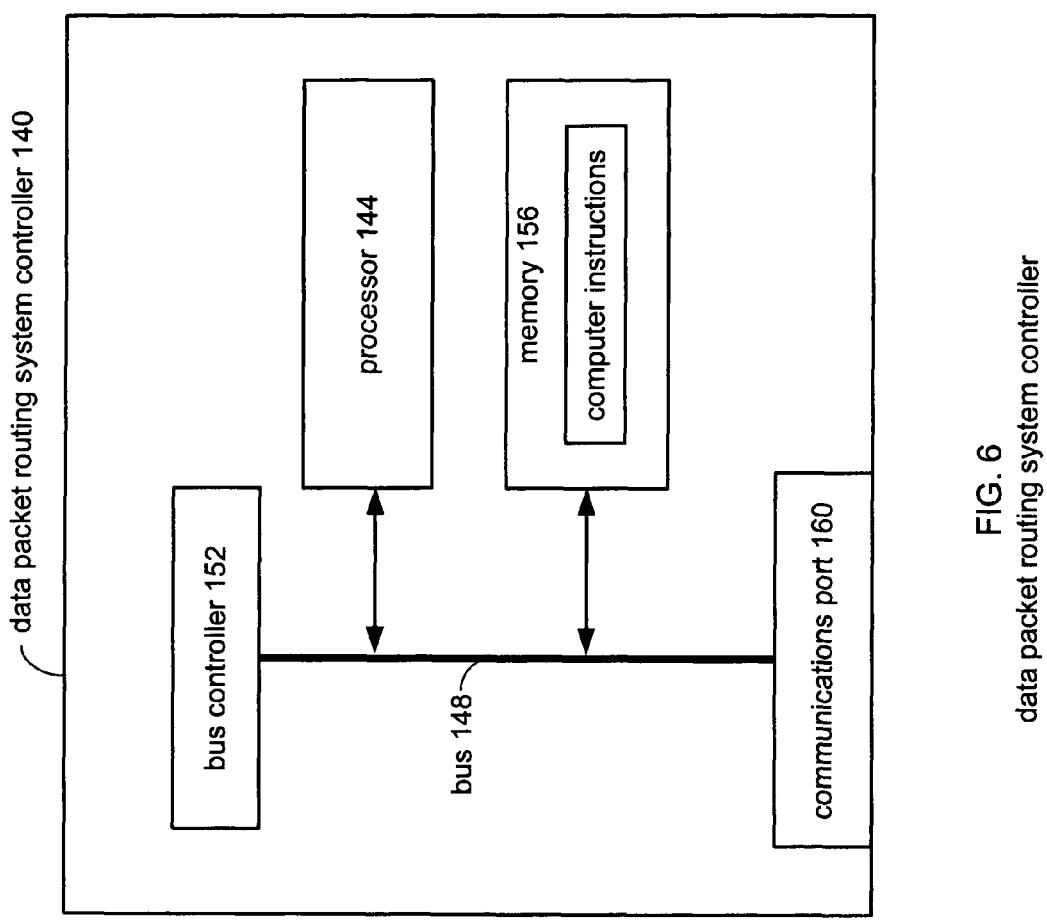
FIG. 6 is a functional block diagram that illustrates one aspect of a data packet routing system controller.

FIG. 6 is a functional block diagram that illustrates one aspect of a data packet routing system controller. Referring now to FIG. 6, data packet routing system controller 140 includes a processor 144 that is coupled to communicate over a bus 148. A bus controller 152 controls communications over bus 148. Memory 156 further is coupled to bus 148 and includes computer instructions that are retrieved by processor 144 over bus 148 for execution. The computer instructions within memory 156 define the operational logic of data packet routing system controller 140. For example, memory 156 includes computer instructions that define the data packet routing system controller operational logic. Specifically, the computer instructions within memory 156 define routing logic for generating control commands to switch each photonic switch operably coupled to data packet routing system controller 140. More specifically, computer instructions within memory 156 define routing logic for mapping destination IP addresses to output port and photonic switch positions based on the IP address within the data packet header.

Bus controller 152 is further coupled to a communications port 160 through which data packet routing system controller 140 transmits control commands to the photonic switches. Thus, when processor 144 retrieves the computer instructions stored within memory 156 and executes them to determine that it should generate control commands to the photonic switches, processor 144 formats the signal and transmits it over bus 148 through bus controller 152 and out communications port 160 for transmission to the photonic switches.

Data packet routing system controller 140 may be formed as a separate logic device or it may be formed internally within the data packet routing system. Further, the data packet routing system controller may be formed of other technologies such as ASICs or FPGAs as is known to one of average skill in the art.

FIG. 7 illustrates a photonic switch mapping table according to one embodiment of the present invention. The intelligence controlling each photonic switch maintains a mapping table similar to the configuration table maintained by routers in the data packet network. The destination IP address, as defined in the data packet header, of each data packet routed through the photonic switch is entered into the mapping table. The input port switch information and output port switch information used in routing the data packet is stored in the switch and switch position fields, respectively. The input and output port information is continuously updated according to known input and output line conditions such as line traffic and router status. The next two fields are variable length fields. The switch field contains an entry for each switch used in the photonic switch. This allows for multiple input and output switches in a multi-stage switch. The switch position field contains an integer value for every entry in the switch field and represents the switch position of the respective switch used in routing the data packet through the photonic switch.

Figure 8:
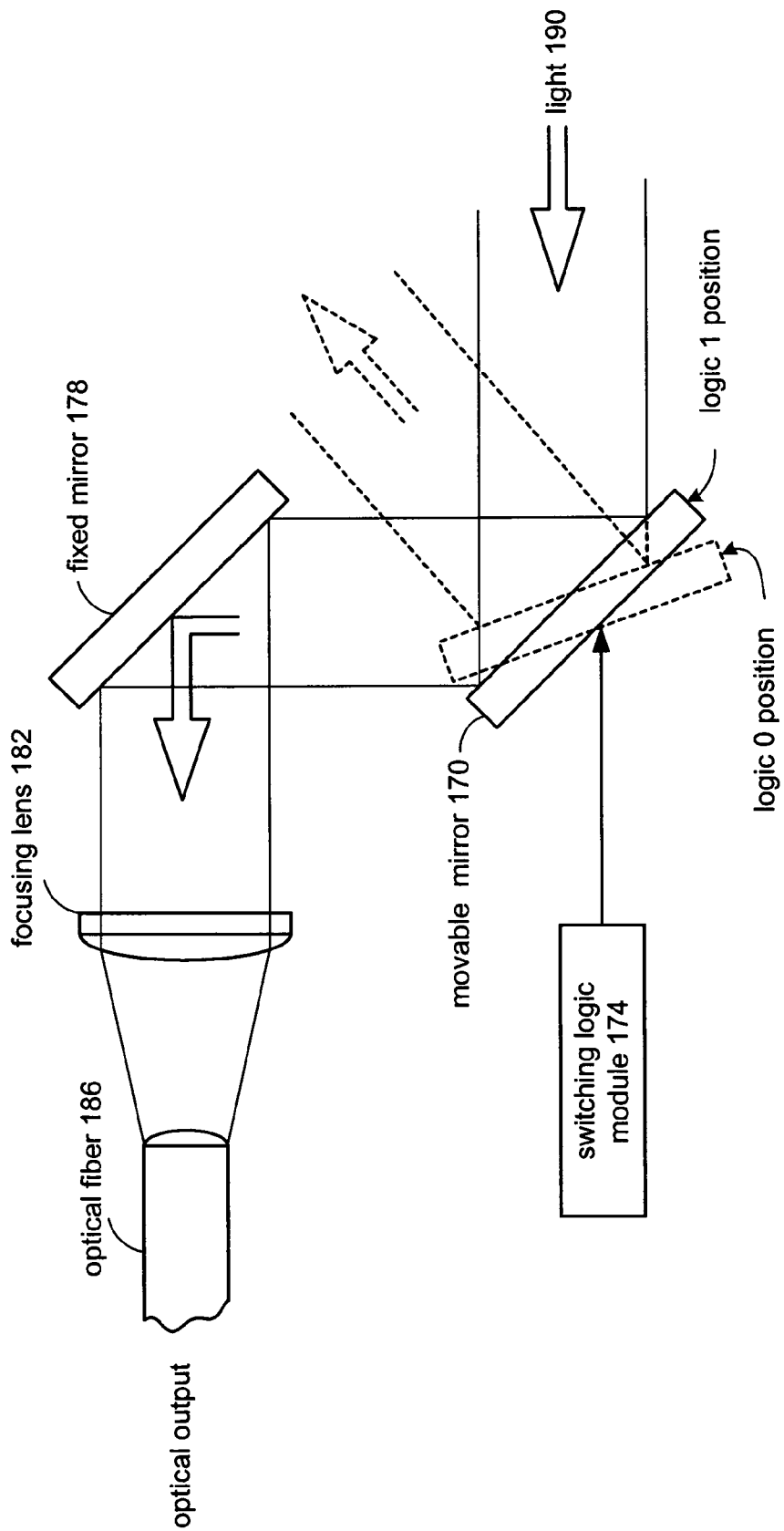
FIG. 8 illustrates operation of an optical binary switch.

FIG. 8 illustrates operation of an optical binary photonic switch. The photonic switch comprises a plurality of switching modules that are used to route input optical data received at an input optical port to a selected output optical port. Each switching module comprises a plurality of optical switches to route the data packet. FIG. 8 illustrates a simple binary switch for discussion purposes but is indicative of the optical switching of the photonic switch. Continuing with the description of FIG. 8, the binary switch has two states: ON or OFF. The binary switch comprises a movable mirror 170, a switching logic module 174, a fixed mirror 178, a focusing lens 182, and an optical fiber 186 coupled to an optical output.

The binary switch produces a logic 1 or a logic 0 depending on the position of movable mirror 170 controlled by switching logic module 174. The input optical data, illustrated as light 190, strikes movable mirror 170 and is reflected to fixed mirror 178 when movable mirror 170 is in the logic 1 position. Light 190 is reflected by fixed mirror 178 on to focusing lens 182 which concentrates light 190 on the input of optic fiber 186. To produce a logic 0, movable mirror 170 is positioned by switching logic module 174 to reflect light away from fixed mirror 178. In the logic 1 position the switch is ON and in the logic 0 position the switch is OFF. Switching logic module 174 controls the position of movable mirror 170 as is known to one of average skill in the art.

In a more complex switch such as an optical cross-connect switch, a movable mirror reflects light to a selected mirror of a plurality of fixed mirrors. The light reflected from each fixed mirror is operably coupled to an optical output or to the input of another optical switch. The coupling of successive layers of optical switches creates a photonic switch that can function as 1 to N multiplexer or as an M to N cross-connect switch.

Figure 9:
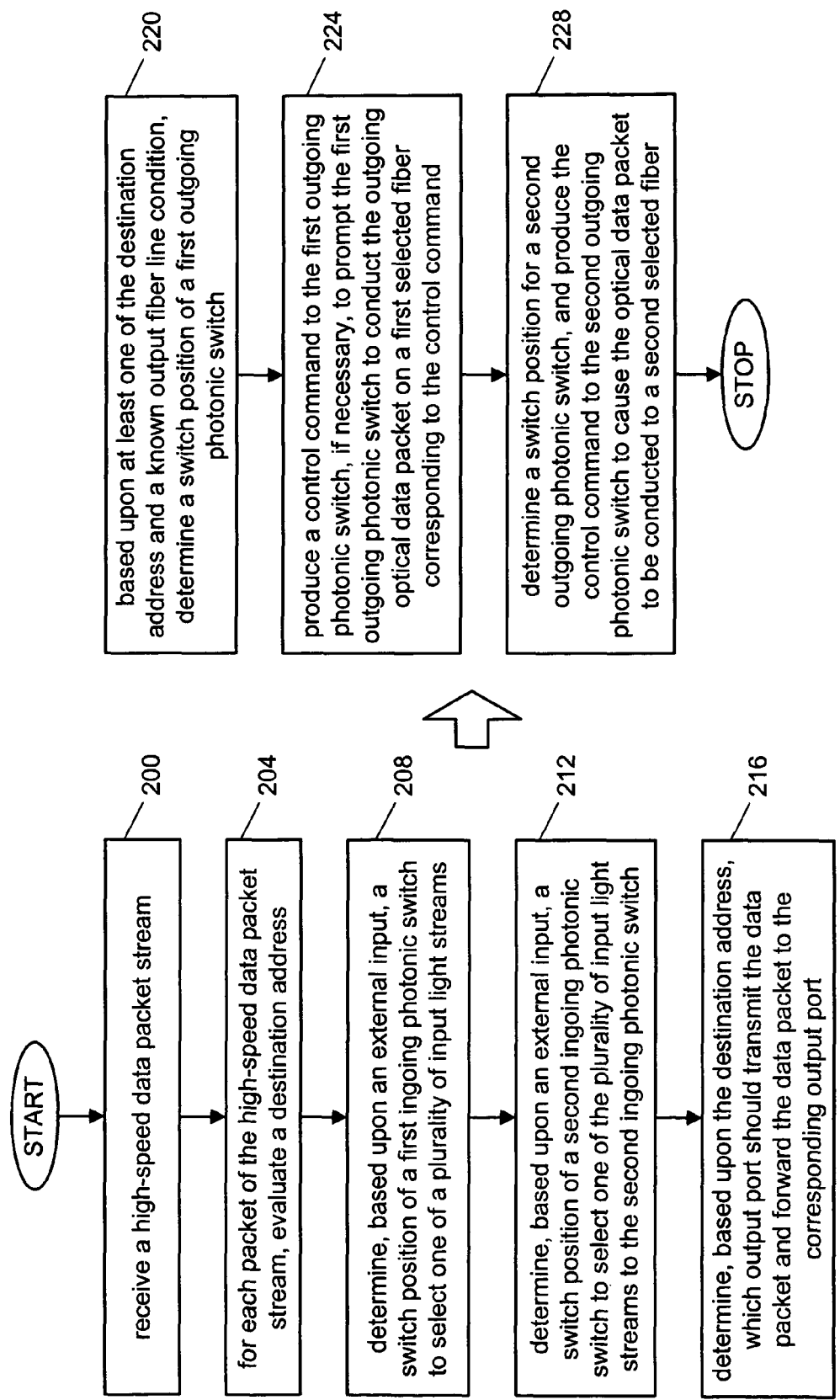
FIG. 9 is a flow chart for a method of routing a data packet in a high-speed routing system in one embodiment of the present invention.

FIG. 9 is a flowchart for a method of routing a data packet in a high-speed routing system in one embodiment of the present invention. The high-speed routing system, comprising one or more ingoing photonic switches and one or more outgoing photonic switches, receives a high-speed data packet stream (step 200), over a fiber line, at a photonic switch input port. Each data packet of the high-speed data packet stream includes an IP destination address in the data packet header, and the routing system evaluates the destination address (step 204) of each packet in the high-speed data packet stream. The routing system, based upon an external input, determines a switch position of a first ingoing photonic switch to select one of a plurality of input light streams (step 208) that comprises the high-speed data packet stream. In a multi-stage photonic switch, the invention includes determining, based upon an external input, a switch position of a second ingoing photonic switch to select one of the plurality of input light streams to the second ingoing photonic switch (step 212). The external input is operably coupled from a switch intelligence comprising one of a routing logic and a data packet routing system controller. The operation of the data packet routing system controller was previously described in relation to FIG. 6.

The high-speed routing system determines, based upon the destination address, which output port should transmit the data packet and forwards the data packet to the corresponding output port (step 216). Based upon at least one of the destination address and a known output fiber line condition, the high-speed routing system determines a switch position of a first outgoing photonic switch (step 220) and produces a control command to the first outgoing photonic switch if necessary (step 224). The condition of the output fiber lines is updated continuously and maintained in the mapping table as previously described in relation to FIG. 7. The high-speed routing system uses this information to determine the routing path through the ingoing and outgoing photonic switches (step 228). This generally includes determining the switch position for a second outgoing photonic switch, which second outgoing photonic switch is coupled to the first outgoing photonic switch and produce the control command to the second outgoing photonic switch, if necessary, to cause the data packet to be coupled to a correct fiber line in one embodiment of the invention.

Figure 10:
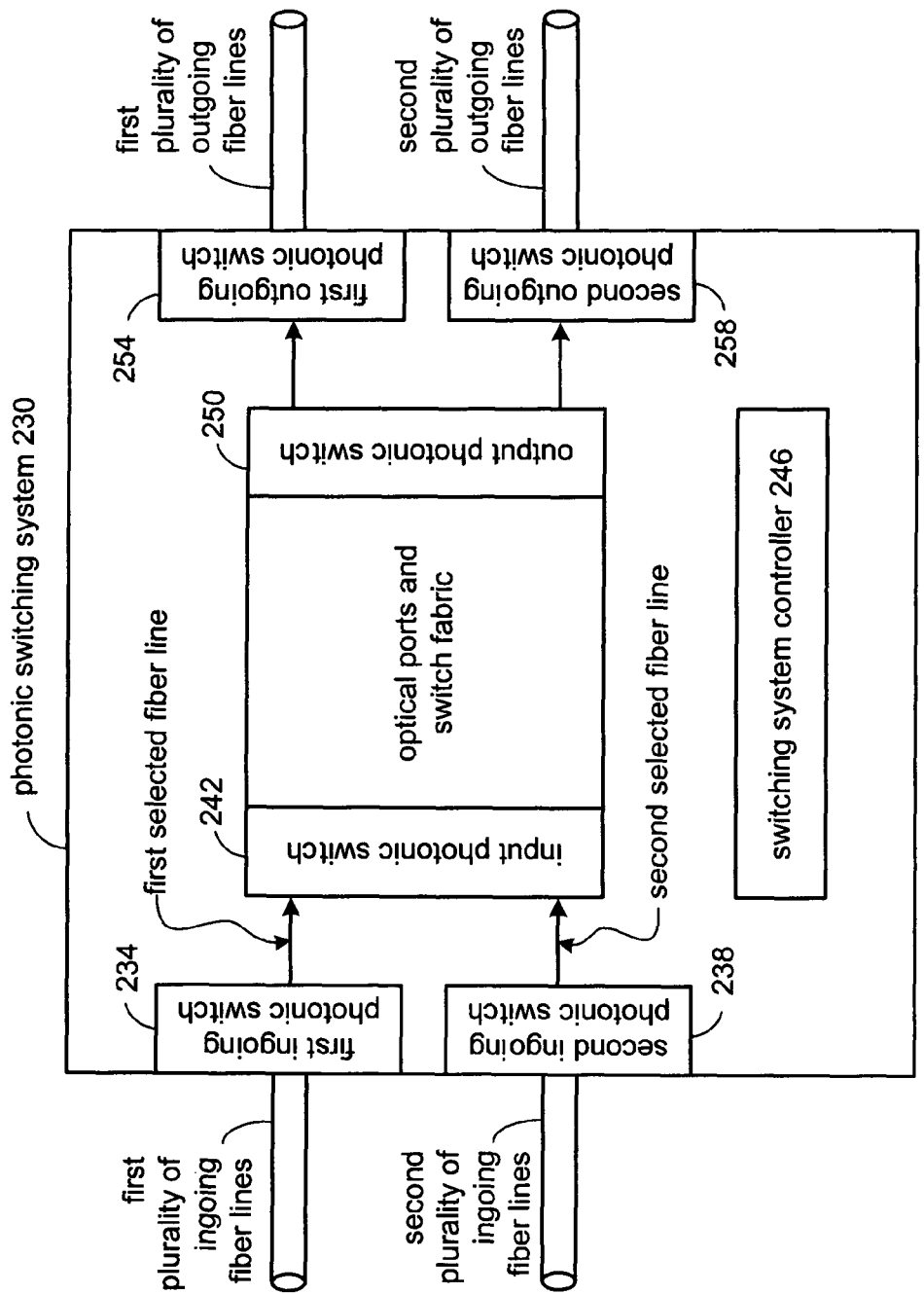
FIG. 10 illustrates a multi-stage photonic switching system according to one embodiment of the present invention.

FIG. 10 illustrates a multi-stage photonic switching system according to one embodiment of the present invention. This embodiment expands the number of fiber lines that are switched, or cross-connected, from input to output. A single-stage photonic switching system, routing system 80 of FIG. 4 for example, typically receives ingoing data packets over ingoing fiber lines connected to a single NAP. Similarly, data packets are routed to an output port for switching to outgoing fiber lines that connect to a single NAP. Multi-stage photonic switching system 230 incorporates a plurality of ingoing photonic switches coupled to receive data packets over a plurality of ingoing fiber lines. Each of the plurality of the ingoing fiber lines connects to a different NAP. A plurality of outgoing photonic switches is coupled to receive data packets from an output photonic switch. Each of the plurality of outgoing photonic switches connects to a different NAP over a plurality of outgoing fiber lines.

A first ingoing photonic switch 234 receives data packets from a first NAP (not shown) over a first plurality of ingoing fiber lines. A second ingoing photonic switch 238 receives data packets from a second NAP (not shown) over a second plurality of ingoing fiber lines. A first selected fiber line of the first plurality of ingoing fiber lines is selected by first ingoing photonic switch 234 and connected to a first input of input photonic switch 242 according to control commands received from switching system controller 246. A second selected fiber line of the second plurality of ingoing fiber lines is selected by second ingoing photonic switch 238 and connected to a second input of input photonic switch 242 according to control commands received from switching system controller 246.

Routing of data packets from input photonic switch 242, through the optical ports and switch fabric, to an output photonic switch 250 is a functional equivalent to the operation of routing system 80 described with respect to FIG. 4. Continuing with the discussion of FIG. 10, data packets received by output photonic switch 250 are routed according to information stored in the mapping table. Switching system controller 246 switches the data packets received by output photonic switch 250 to one of a first or second outgoing photonic switch according to the IP address stored in the data packet header. The IP address specified in each data packet header determines which NAP can access the specified IP address. Switching system controller 246 transmits control commands to either a first outgoing photonic switch 254 or to a second outgoing photonic switch 258 to switch the data packet to the correct outgoing fiber line of the outgoing fiber lines for routing to the specified NAP.

Figure 11:
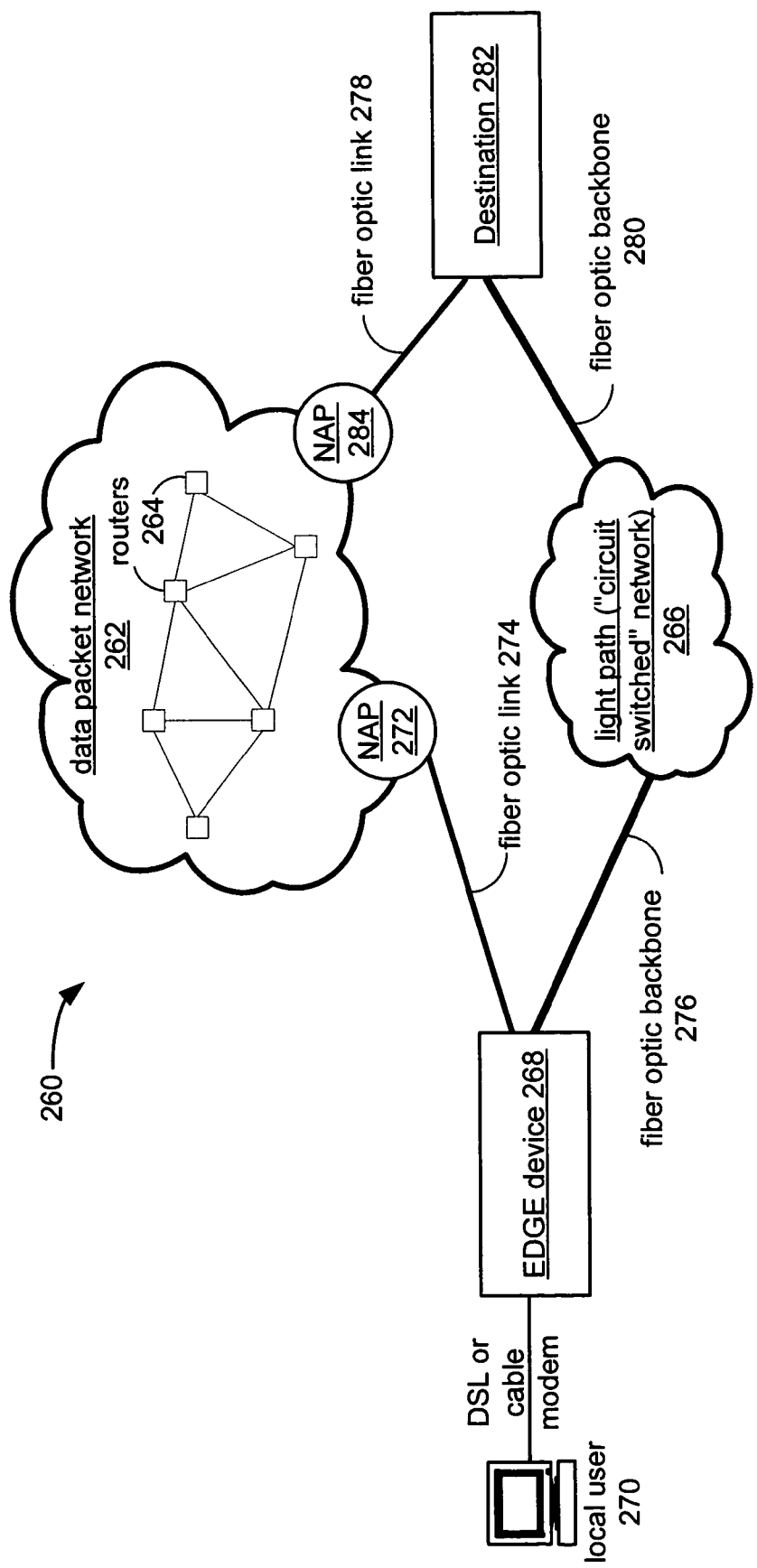
FIG. 11 is a schematic block diagram of a combined circuit switched and data packet network with multi-stage photonic switching according to one embodiment of the present invention.

FIG. 11 is a schematic block diagram of a combined circuit switched and data packet network with multi-stage photonic switching according to one embodiment of the present invention. The combined circuit switched and data packet network, shown generally at 260, comprises a data packet network 262 and a light path 266 (circuit switched network) operably coupled to fiber optic links between an edge device 268 and a destination 282. Access to data packet network 262 is through Network Access Point (NAP) 272 and NAP 284. A plurality of routers 264 within data packet network 262 route data packets to destination 282 based on a destination address stored in the data packet header. Light path 266 comprises a plurality of dedicated end-to-end optical connections and photonic switches to efficiently switch data from fiber optic backbone 276 to fiber optic backbone 280.

A local user 270 sends a large volume of data to destination 282. Edge device 268 is operably coupled to data packet network 262 (a packet switched network) and to light path 266 (a circuit switched network) over fiber optic link 274 and fiber optic backbone 276, respectively. Based on the size of the data transfer, edge device 268 selects one of the packet switched network or the circuit switched network for the data transfer. Data packet network 262 includes a plurality of routers 264 to switch data packets from Network Access Point (NAP) 272 to NAP 284. As is known to one of average skill in the art, routers 264 switch data packets between NAP 272 and NAP 284 based on a destination address stored in the data packet header. Each router maintains a routing table of operational routers available to receive data packets. Data packets are forwarded through the path of routers until they reach destination 282.

Light path 266 is a circuit switched network of dedicated end-to-end optical paths and photonic switches operably coupled between fiber optic backbone 276 and fiber optic backbone 280. When data is transferred from local user 270 to destination 282 via light path 266, a circuit in light path 266 is established or switched between fiber optic backbone 276 and fiber optic backbone 280 by established signaling systems. This switched circuit is a dedicated path from edge device 268 to destination 282 and is maintained until the data transfer is complete then the switched circuit is disconnected which releases the switch resources.

Edge device 268 selects either the data packet network or the circuit switched network based on the most efficient method for the data transfer. Large volumes of data are typically transferred through circuit switched network 266 because of the dedicated connection between local user 270 and destination 282. A smaller size data transfer may be routed through data packet network 266.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. Moreover, as one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

What is claimed is:

1. A method for routing a data packet, the method comprising:
   receiving a data packet stream at a first ingoing photonic switch;
   for each data packet of the data packet stream, evaluating a destination address of the data packet;
   determining whether to bypass a router and transmit the data packet from the first ingoing photonic switch to a first outgoing photonic switch via a dedicated optical path based on a volume of packet data to be transferred;
   determining, based on an external input, a switch position of the first ingoing photonic switch to select one of a plurality of input light streams;
   determining at the first outgoing photonic switch, to which one of a plurality of output ports the first ingoing photonic switch should transmit the data packet and forwarding the data packet to the corresponding output port;
   determining at the first outgoing photonic switch, a switch position of the first outgoing photonic switch based on at least one of the destination address and a known outgoing fiber line condition; and
   producing a control command to the first outgoing photonic switch to prompt the first outgoing photonic switch to conduct an outgoing optical data packet on a first selected fiber corresponding to the control command.

2. The method of claim 1 further including, for each packet of the data packet stream, determining a switch position for a second outgoing photonic switch, which second outgoing photonic switch is coupled to the first outgoing photonic switch by the first selected fiber and producing a control command to the second outgoing photonic switch to cause the outgoing optical data packet to be conducted on a second selected fiber.

3. The method of claim 1 further including determining, based upon the external input, a switch position of a first outgoing photonic switch to select one of a plurality of input light streams being conducted on one of a first plurality of output fibers.

4. The method of claim 3 further including determining, based upon the external input, a switch position of a second outgoing photonic switch to select one of a plurality of output light streams being conducted on one of a second plurality of output fibers coupled to the second outgoing photonic switch.

5. A routing system, comprising:
   at least one input photonic switch coupled to at least one optical port, the at least one optical port receiving data packets carried on one of a plurality of ingoing fiber lines, the at least one input optical port configured to receive optical data and convert the optical data to electrical data;
   at least one output photonic switch coupled to at least one output optical port;
   a switch fabric configured to receive the electrical data from the input optical port and to switch the electrical data to route the electrical data on a packet-by-packet basis to at least one output optical port; and
   for each photonic switch, a plurality of fiber lines coupled to the photonic switch;
     if the photonic switch is coupled to an input optical port, the input optical port is configured to receive data packets carried on one of a plurality of ingoing fiber lines; and
     if the photonic switch is coupled to an output optical port, the output optical port is configured to transmit data packets to the photonic switch to be carried on one of a plurality of outgoing fiber lines; and
   the routing system being configured to determine, based on an external input, a switch position of the first input photonic switch to select one of a plurality of input light streams, the routing system being further configured to determine whether to bypass a router and transmit a plurality of packets through a dedicated optical path based on a volume of packet data to be transferred.

6. The routing system of claim 5 wherein the routing system comprises routing logic configured to produce control commands to each photonic switch coupled to the input optical port to select at least one of the plurality of ingoing fiber lines and to produce control commands to each photonic switch coupled to the output optical port to select at least one of the plurality of outgoing fiber lines.

7. The routing system of claim 6 further comprising a data packet routing system controller wherein the routing logic is defined in computer instructions executed by the data packet routing system controller.

8. The routing system of claim 6 further including routing logic configured to:
   map destination IP addresses to output optical ports and photonic switch positions;
   evaluate a destination IP address within a data packet header and, based upon the mapped output optical port and switch position information:
     route the corresponding data packet to the mapped output optical port; and
     produce a control command to the photonic switch to prompt the photonic switch; and
     conduct the data packet to the selected outgoing fiber line.

9. The routing system of claim 6 further including routing logic configured to:
   map destination IP addresses to the output optical ports and photonic switch positions;
   evaluate a destination IP address within a data packet header and, based upon the mapped output optical port and switch position information as well as known outgoing fiber line conditions:
     route the corresponding data packet to the mapped output optical port; and
     produce a control command to a photonic switch coupled to the mapped output optical port to prompt the photonic switch to conduct the data packet to the selected outgoing fiber line.

10. The routing system of claim 6 wherein the outgoing fiber line is selected according to a destination address on a packet-by-packet basis.

11. The routing system of claim 6 wherein the outgoing fiber line is selected according to the destination address on a packet-by-packet basis based upon a destination address defined within a data packet header.

12. The routing system of claim 6 wherein the outgoing fiber line is selected according to a known output line condition.

13. The routing system of claim 6 wherein an ingoing fiber line is selected according to a known input line condition.

14. A data packet routing system, comprising:
   an ingoing optical switch module having a first plurality of input ports coupled to a plurality of fiber lines carrying ingoing optical data, the ingoing optical switch module configured to conduct optical data to one of a second plurality of output ports;

an outgoing optical switch module having a second plurality of input ports coupled to a plurality of fiber lines carrying outgoing optical data, the outgoing optical switch module configured to conduct optical data to one of a first plurality of output ports;

a routing system coupled to at least one fiber line of the second plurality of output ports of the ingoing optical switch module and coupled to least one fiber line of the second plurality of input ports of the outgoing optical switch module;

at least one fiber line configured to couple the ingoing optical switch module to the outgoing optical switch module to create an optical bypass line; and bypass and routing logic comprising a processor and memory configured to:
  determine whether optical data is to be conducted through the routing system or whether the optical data is to bypass the routing system and be conducted through the optical bypass line based on a volume of packet data to be transferred; and
  determine, based on an external input, a switch position of the first ingoing optical switch module to select one of a plurality of ingoing optical data streams carried on the plurality of fiber lines.

15. The data packet routing system of claim 14 wherein the bypass and routing logic of the routing system is configured to determine whether data is to be conducted through the routing system or whether the routing system is to be bypassed on a data packet session basis.

16. The data packet routing system of claim 15 wherein the bypass and routing logic of the routing system is configured to communicate with an external application within a client host to determine whether to bypass a router.

17. The data packet routing system of claim 16 wherein the bypass and routing logic of the routing system is configured to communicate with the external application within the client host to determine when to stop bypassing the routing system.

18. The data packet routing system of claim 14 wherein the bypass and routing logic of the routing system is configured to determine whether data is to be conducted through the routing system or whether the routing system is to be bypassed on a packet-by-packet basis.

19. The data packet routing system of claim 14 wherein the bypass and routing logic is external to the routing system.

20. The data packet routing system of claim 14 wherein the bypass and routing logic is configured to bypass the routing system to cause the ingoing optical data to be transmitted directly to a specified output port.

21. A method for conducting traffic through a network, the method comprising:
  receiving, at a first photonic switch, data packets for transmission through an optical medium;
  determining whether to bypass a router and transmit the data packets through a dedicated optical path based on a volume of packet data to be transferred; and
  determining, based on an external input, a switch position of the first photonic switch to select one of a plurality of input light streams;
  if the data packets are to be transmitted though the data packet network:
    conducting the data packets in an optical form toward a first optical port; and
    producing a control command to the first photonic switch to conduct the data packets in an optical form to a packet network router for delivery to a destination by way of a plurality of routers of the data packet network; and
  if the data packets are to be transmitted through the dedicated optical path:
    determining to conduct the data packets in an optical form through a circuit switched network;
    producing the data packets in the optical form to a second optical port; and
    producing a control command to the first photonic switch to route the data packets in the optical form to a circuit switched network for delivery to a destination by way of the dedicated optical path; and
  the method being performed within an edge device including the first photonic switch for directing the data packets in the optical form in one of a plurality of optical media for conducting optical data.

* * * * *